Patented June 13, 1950

2,511,043

UNITED STATES PATENT OFFICE

2,511,043

PROCESS IN NEUTRALIZING CAPILLARY ACTIVE SULFONATED PRODUCTS

Georg Ludvig Busch, Copenhagen, Denmark

No Drawing. Application July 28, 1947, Serial No. 764,255. In Denmark May 1, 1946

Section 1, Public Law 690, August 8, 1946
Patent expires May 1, 1966

7 Claims. (Cl. 260—400)

It is known in substances of a chiefly hydrophobic, preferably lipophilic, nature to introduce one or more hydrophilic groups imparting capillary active properties to the substance in question. Such groups are most frequently sulphonic acid and/or sulphuric acid ester groups and the introduction is usually effected by treating the substance in question with suitable sulphonating agents, e. g. sulphuric acid, oleum or chlorosulphonic acid. Whether sulphonic acid or sulphuric ester groups are introduced by this treatment is dependent on the molecular structure of the raw material and the conditions prevailing during the treatment.

In this treatment, the so-called sulphonating operation, usually a considerable excess of the sulphonating agent is used, the principle of many sulphonating processes being by this means to bind the water produced during the reaction. For instance, this is the case in esterification. The excess of sulphonating agent thus employed must be removed subsequently by neutralization. Hitherto this neutralization has been performed by treating the reaction mixture produced by the sulphonating operation ("the crude sulphonate"), if desired after dilution with water, with a strong aqueous alkali hydroxide solution, such as caustic potash or soda, the said alkali solution being poured into the crude sulphonate under conditions of suitable agitation and cooling.

This neutralization method has various drawbacks, however. The greatest drawback consists in that inevitably a partial decomposition of the sulphonated product tends to take place. As the crude sulphonates generally are highly viscous in practice it is difficult to distribute the neutralizing agents uniformly in the crude sulphonate sufficiently rapidly. There will at local points easily occur such a high alkalinity that a saponification of the sulphonated product takes place. Moreover, the neutralization will give rise to a dilution of the excess of sulphonating agent present, which may result in undesirable decomposition of the sulphonated product due to acid hydrolysis. Furthermore, the dilution of the excess of sulphonating agent and the neutralization itself will be accompanied by a vigorous development of heat, thereby promoting the undesired saponification and hydrolysis processes. Hence it is usually necessary to effect the neutralization with considerable cooling in order to obtain an adequately rapid neutralization, but in such case the rapid and uniform admixture of the crude sulphonate and the alkali hydroxide solution is rendered more difficult owing to the increased viscosity of the crude sulphonate at the lower temperature.

Previously these drawbacks have been recognized and attempts have been made to eliminate them without, however, deviating from the use of an aqueous alkali hydroxide solution as the neutralizing agent.

According to the present invention relating to a process for the neutralization of capillary active sulphonated products, an entirely new way is followed whereby the aforementioned drawbacks are avoided whilst the neutralization can be effected more quickly and more easily.

The process according to the present invention is characterized in that the neutralization is effected in an inert organic solvent for the sulphonated product in which solvent there is suspended a neutralizing agent that is slightly soluble or insoluble in the solvent.

As the alkaline neutralizing agent is slightly soluble or insoluble in the medium in which the neutralization is effected there cannot occur any appreciable alkali hydrolysis during the neutralization, the more so since the sulphonated product immediately dissolves in the organic solvent. Nor can there be any appreciable acid hydrolysis since the neutralization is not effected in an aqueous solution as in the prior art. Moreover the sulphonated product will immediately dissolve in the organic solvent whereas the excess of sulphonating agent will not. The neutralization of the latter consequently will be effected less vigorously, the neutralizing agent likewise not being appreciably dissolved in the solvent but rather being present in the form of a suspension. Hence it results that in practice it is much easier than in hitherto known processes to control the temperature of the neutralization mixture so that it is possible to effect the neutralization more moderately than in accordance with the known methods.

By the process according to the present invention it is rendered possible to obtain the sulphonated product in a more nearly pure form. The neutralized product will not only not contain appreciable quantities of the products of decomposition produced by the previously employed neutralization procedure by means of an aqueous alkali solution, but it will also be possible by an adequate choice of solvent and neutralizing agent to precipitate the salt formed by the neutralized excess of sulphonating agent, which salt can be readily removed by filtration or centrifugal action. The sulphonated product may then be obtained directly in a purified state from the solution freed from the inorganic salt, by evaporation of the organic solvent from the solution.

As a solvent for the sulphonating agent any organic solvents may be used that do not react in an undesirable way with the sulphonating agent under the neutralizing conditions. For instance, aliphatic alcohols, such as methyl alcohol, ethyl alcohol, propyl alcohols, butyl alcohols etc. may be used; furthermore, polyhydric aliphatic alcohols, such as ethylene glycol and glycerols; aliphatic hydrocarbons or mixtures thereof, such as petroleum fractions, aromatic hydrocarbons, e. g. benzene, toluene; halogenated hydrocarbons, such as trichloroethylene; nitrated hydrocarbons, e. g. nitroparaffines; ketones, e. g. acetone and methyl ethyl ketone; ethers, e. g. dimethyl ether, diethyl ether, diisopropyl ether, etc. may be employed in the manner indicated.

It is not necessary to use the water miscible organic solvents in an anhydrous state. A water content of e. g. 10–15% will not prejudice the progress of the neutralization, but rather may facilitate its induction. When using organic solvents which are immiscible with water, some water may be emulsified in the solvent, if desired.

As a neutralizing agent there may be used any substance showing an alkaline reaction that is slightly soluble or insoluble in the organic solvent under the prevailing neutralizing conditions and which does not react therewith in an undesirable manner. Examples of suitable neutralizing agents are hydroxides such as calcium, barium, magnesium and zinc hydroxide; oxides such as calcium, magnesium, barium, zinc, copper, mercury and silver oxide; salts having an alkaline reaction such as phosphates, sulphites, acetates, etc. Preferred neutralizing agents are carbonates and bicarbonates, such as sodium carbonate, sodium bicarbonate, potassium carbonate, potassium bicarbonate, and calcium carbonate.

During the neutralization step not only a neutralization of the excess of the sulphonating agent is effected but also a neutralization of the sulphonated product itself. In view of the recovery of the sulphonated product from the neutralization mixture it is preferred that the neutralized sulphonated product be soluble in the organic solvent, and that the neutralized sulphonating agent not only be insoluble in the organic solvent, but also in any water which may be present at the beginning of the neutralization or which may be formed by the neutralization. In this case the neutralized sulphonated product will at the end of the neutralization operation be present in the organic solvent in a dissolved state, whereas the neutralized sulphonating agent will be present in a precipitated form together with any unconsumed neutralizing agent. The sulphonated product can be easily recovered from the solution by filtration or by centrifugal action and evaporation of the solvent. For many practical purposes it will not be necessary, however, to separate the inorganic salt of the sulphonating agent that is formed by the neutralization.

When choosing the neutralizing agent, the alkalinity of the same should also be taken into account, e. g. the pH value established by the neutralizing agent in the solvent, which may be aqueous to the extent indicated above. The pH should not be so high as to bring about conditions for saponification of the sulphonated product. This is particularly of importance in cases where the sulphonated product consists of sulphonated partial glycerides, i. e., mono- or di-glycerides of higher fatty acids. In such cases a pH— value of about 8.5 will be appropriate. Generally it will be suitable if the pH lies between 5 and 9.

The process according to the present invention may be used in connection with the neutralization of all kinds of crude sulphonates having capillary active properties, for instance, the above mentioned sulphonated mono- and di-glycerides of higher fatty acids, sulphonated fatty alcohols and aromatic alkylated sulphonic acids.

The following working examples serve additionally to illustrate the invention.

*Example 1*

40 kg. highly sulphonated coco fat, which is a brown, viscous liquid, is poured as a thin jet into 40 kg. finely pulverized sodium bicarbonate, suspended in 40 liters green spirit (93 per cent) with simultaneous stirring in an ordinary vessel equipped with a stirring device. The crude sulphonate is quickly dissolved in the spirit, being subsequently neutralized by the bicarbonate with development of carbon dioxide, and the said carbon dioxide will not cause any frothing, as this is prevented by the spirit.

Since the bicarbonate is insoluble in the spirit there will be no alkali hydrolysis, and as the acid is poured into the spirit with simultaneous neutralization an acid hydrolysis in the spirit phase is very unlikely. Moreover, the water formed by the process will, if the temperature is maintained at approximately 25 deg. C., be absorbed by the sodium sulphate produced, whereby $Na_2SO_4.10H_2O$ is obtained, which is insoluble in the spirit. On the other hand, the sodium salt of the capillary active substance is soluble in the spirit.

*Example 2*

40 kgms. of highly sulphonated coconut fat are poured as a thin jet into 40 liters of green spirit (93%) in which there is suspended 17.6 kgms. of calcium hydroxide, with simultaneous stirring. By the neutralization calcium sulphate is formed which takes up the water that is also formed by the neutralization, said calcium sulphate being precipitated in form of $CaSO_4.2H_2O$, whilst the neutralized sulphonated product in the form of its calcium salt is dissolved in the spirit, wherefrom it can be recovered by evaporation of the spirit. By the addition of a soda solution to a solution of the calcium salt prepared in this manner the corresponding sodium salt can be obtained. The free sulphonic acid can be obtained by supplying carbon dioxide to the alcoholic solution of the calcium salt.

*Example 3*

63.6 kgms. of sulphonated dodecanol are poured as a thin jet into 50 liters of acetone in which there is suspended 54 kgms. of anhydrous sodium sulphite, with simultaneous stirring. The water formed during the neutralization will, if the temperature is maintained at approximately 25° C., be taken up by the sodium sulphate formed, $Na_2SO_4.10H_2O$ being produced, the said compound being insoluble in the acetone. The sodium salt of the fatty alcohol sulphonte can be recovered as in Example 2.

In the embodiments of the process according to the present invention as described in the above examples, neutralization in batches is effected. The process can also be performed continuously, however, the crude sulphonate and the suspension of the neutralizing agent in the organic solvent then being introduced simultaneously in calculated proportions into the neutralization vats.

By the process according to the present invention sulphonated products are obtained which are substantially free from products of decomposition produced by saponification and/or hydrolysis. Thus they are clearly soluble in water and can, for instance, be used as washing, cleansing, emulsifying, wetting and frothing agents in a solid or a liquid form, either alone or in combination with other substances, e. g. fillers or other additives having properties desirable for the use in question.

Having thus fully described my invention I claim as new and desire to secure by Letters Patent:

1. The process of neutralizing a capillary active sulphonated organic product which comprises suspending a neutralizing agent in an inert organic solvent for the neutralized capillary active sulphonated organic product in which said agent is not more than slightly soluble, and mixing a capillary active sulphonated organic product with said suspension and thereby effecting the neutralization of said product, said solvent being used in an amount sufficient to dissolve the said neutralized product.

2. The process as set forth in claim 1 in which said sulphonated organic product is introduced as a thin jet into said suspension while stirring.

3. The process as set forth in claim 1 in which said capillary active sulphonated organic product and said suspension are introduced simultaneously in proportioned amounts into a neutralizing zone.

4. The process of neutralizing capillary active sulphonated partial glycerides of higher fatty acids which comprises suspending a neutralizing agent in an inert organic solvent for the neutralized sulphonated partial glycerides of higher fatty acids in which said agent is not more than slightly soluble, and mixing capillary active sulphonated partial glycerides of higher fatty acids with said suspension and thereby effecting neutralization of said sulphonated partial glycerides of higher fatty acids, said solvent being used in an amount sufficient to dissolve the said neutralized sulphonated partial glycerides of higher fatty acids.

5. The process of neutralizing a capillary active sulphonated fatty alcohol product which comprises suspending a neutralizing agent in an inert soluble, and mixing capillary active sulphonated organic solvent for the neutralized sulphonated fatty alcohol product in which said agent is not more than slightly soluble, and mixing a capillary active sulphonated fatty alcohol product with said suspension and thereby effecting the neutralization of said product, said solvent being used in an amount sufficient to dissolve the neutralized product.

6. The process of neutralizing a capillary active sulphonated organic product which comprises suspending an alkaline reacting carbonate in a lower aliphatic alcohol, and mixing a stream of said product with said suspension to effect the neutralization thereof, said alcohol being used in sufficient amount to dissolve said neutralized compound.

7. The process as set forth in claim 4 in which the neutralizing agent is sodium bicarbonate.

GEORG LUDVIG BUSCH.

REFERENCES CITED

The following references are of record in the file of this patent:

UNITED STATES PATENTS

| Number | Name | Date |
| --- | --- | --- |
| 1,804,183 | Seck | May 5, 1931 |
| 2,078,638 | Reibnitz | Apr. 27, 1937 |
| 2,285,337 | Kapp et al. | June 2, 1942 |
| 2,328,931 | Steik | Sept. 7, 1943 |

Certificate of Correction

Patent No. 2,511,043                                                                                           June 13, 1950

GEORG LUDVIG BUSCH

It is hereby certified that errors appear in the printed specification of the above numbered patent requiring correction as follows:

Column 4, line 67, for "sulphonte" read *sulphonate*; column 6, line 10, strike out the words "soluble, and mixing capillary active sulphonated" and insert the same before "partial" in line 1, same column;

and that the said Letters Patent should be read with these corrections therein that the same may conform to the record of the case in the Patent Office.

Signed and sealed this 5th day of September, A. D. 1950.

[SEAL]

THOMAS F. MURPHY,
*Assistant Commissioner of Patents.*